United States Patent
Zhang et al.

(10) Patent No.: US 8,889,311 B2
(45) Date of Patent: Nov. 18, 2014

(54) CATHODE PRESSURE CONTROL UTILIZING A CAPACITANCE MODEL

(71) Applicant: GM Global Technology Operations LLC, Detroit, MI (US)

(72) Inventors: Yanyan Zhang, Victor, NY (US); Joseph Mussro, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/660,001

(22) Filed: Oct. 25, 2012

(65) Prior Publication Data

US 2014/0120443 A1    May 1, 2014

(51) Int. Cl.
   *H01M 8/04*    (2006.01)

(52) U.S. Cl.
   USPC ............ 429/444; 429/428; 429/430; 429/443

(58) Field of Classification Search
   None
   See application file for complete search history.

(56) References Cited

U.S. PATENT DOCUMENTS

2009/0098426 A1* 4/2009 Tsuchiya et al. ................ 429/23
2011/0217609 A1* 9/2011 Mallavarapu et al. ........ 429/429

\* cited by examiner

*Primary Examiner* — Sarah A Slifka
(74) *Attorney, Agent, or Firm* — Dinsmore & Shohl LLP (57) ABSTRACT

Systems and methods to control fuel cell stack pressure through a cathode backpressure valve. A flow offset value is used as a capacitance term during transient operational conditions to account for discrepancies between the stack flow setpoint and the actual stack flow. The capacitance term is based on operational parameters, including stack pressure changes, stack coolant temperature and stack volume. The additional flow produced by the capacitance terms may be fed, along with pressure drop models and a valve position model to provide a more accurate prediction of valve position.

9 Claims, 9 Drawing Sheets

CATHODE PRESSURE CONTROL UTILIZING A CAPACITANCE MODEL

BACKGROUND OF THE INVENTION

The present invention relates generally to controlling a fuel cell stack, and more particularly to systems and methods for controlling cathode stack pressure during operational transients through manipulation of a backpressure valve by taking into consideration capacitance terms associated with fuel cell stack operational parameters as a way to provide a more accurate valve position instruction.

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources. In a typical fuel cell (such as a proton exchange membrane or polymer electrolyte membrane (in either event, PEM), a pair of catalyzed electrodes are separated by an ion-transmissive medium (such as a perfluorinated sulfonic acid or an equivalent). The chemical reaction occurs when an ionized form of a gaseous reducing agent (such as hydrogen, $H_2$) introduced through one of the electrodes (the anode) crosses the ion-transmissive medium and combines with an ionized form of a gaseous oxidizing agent (such as oxygen, $O_2$) that has been introduced through the other electrode (the cathode). The electrons that were liberated in the ionization of the hydrogen proceed in the form of direct current (DC) to the cathode via external circuit that typically includes a load where useful work may be performed. The combination of the ions, electrons and supplied oxygen at the cathode produce water as a benign by-product. The power generation produced by the current flow can be increased by combining numerous such cells to form a fuel cell stack.

Ancillary equipment, such as compressors and associated conduit, valves, controllers or the like, are used to deliver the reactants to and from the fuel cell stack as a way to maintain the temperature, pressure, flow rate and other operational characteristics of the reactants throughout the fuel cell system. Nevertheless, it remains challenging and difficult to develop new control systems to precisely regulate the pressure of such reactants used in a fuel cell system. These challenges are particularly acute during transient operating conditions, where flow through a backpressure valve may allow larger or smaller quantities of flow than that requested by the cathode stack during such transient, resulting in inaccurate prediction of the backpressure valve position setting. Additional system complexities, such as the use of bypass valves, recirculation valves or the like, exacerbates the challenges, as do vehicular-based applications, where reliability, weight and cost are significant factors.

SUMMARY OF THE INVENTION

In accordance with the teaching of the present invention, devices and methods for controlling pressure in a fuel cell stack are disclosed. According to a first aspect of the invention, a method includes utilizing a controller to generate a command signal that can be used to control a fuel cell stack backpressure valve. The controller employs elements of a feedforward-based control strategy (also called a feedforward component) and a feedback-based control strategy in order to regulate the backpressure valve position to control the fuel cell stack pressure. Thus, while the control strategy is feedforward-based, it may still include feedback-based elements, such as stack pressure, stack airflow or total (i.e., stack plus any bypass) airflow as a way to provide corrective instructions. The feedforward-based strategy uses input fed from one or more pressure drop models and a backpressure valve position model. Importantly, because a stack flow setpoint is used as one of the terms as part of the feedforward control of the backpressure valve setting, the present invention additionally includes a stack capacitance model that acts as an offset term for the stack flow setpoint. This capacitance term is valuable because the stack flow setpoint may be erroneous during stack pressure setpoint changes or related transient operational conditions.

In another embodiment, a fuel cell system is disclosed. The system includes a fuel cell stack and a plurality of valves to control the flow of reactants or related fluids to and from the stack. In a particular form, the valves include a backpressure valve and one or more of a bypass valve and a recirculation valve (such as used for compressor discharge recirculation). An inlet of the backpressure valve is connected to an outlet of the fuel cell stack, while the bypass valve is configured to selective route airflow around the fuel cell stack to help meet a cathode airflow setpoint or related requirement. The system also includes a processor-based controller to run instructions to determine a preferred position of the backpressure valve. The instructions utilize one or more pressure drop models as input to the backpressure valve position calculation. At least one of the pressure drop models and the backpressure valve position model use as a stack flow setpoint offset a modifier that is generated by a capacitance model as a way to provide a more accurate prediction of the desired backpressure valve position than that possible by the combined instructions produced by the combined pressure drop calculations and backpressure valve position calculation alone.

In another embodiment, a controller for a fuel cell system is disclosed. The controller includes one or more processors and memory in signal communication with the processor (or processors) to store instructions pertaining to regulating the position of a backpressure valve that is fluidly connected to an outlet of the fuel cell stack. The instructions (which may be in the form of a code or one or more models) cause the processor to control reactant characteristics in a fuel cell stack; the instructions include a valve position model, a stack capacitance model and one or more pressure drop models. The models cooperate such that upon receipt of information pertaining to an operational transient in the fuel cell stack, output (for example, an output signal) from the stack capacitance model modifies airflow control signals used by or in conjunction with at least one of the valve position model and the one or more pressure drop models. This modified signal may constitute a feedforward portion of a command signal that is used by the controller for updating the backpressure valve position. Additional feedback terms may also form part of the instructions, and may include information pertaining to stack airflow setpoints, total (i.e., stack plus bypass) airflow setpoints or the like.

BRIEF DESCRIPTION OF THE DRAWINGS

The following detailed description of specific embodiments can be best understood when read in conjunction with the following drawings, where like structure is indicated with like reference numerals and in which.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

Figure 1:
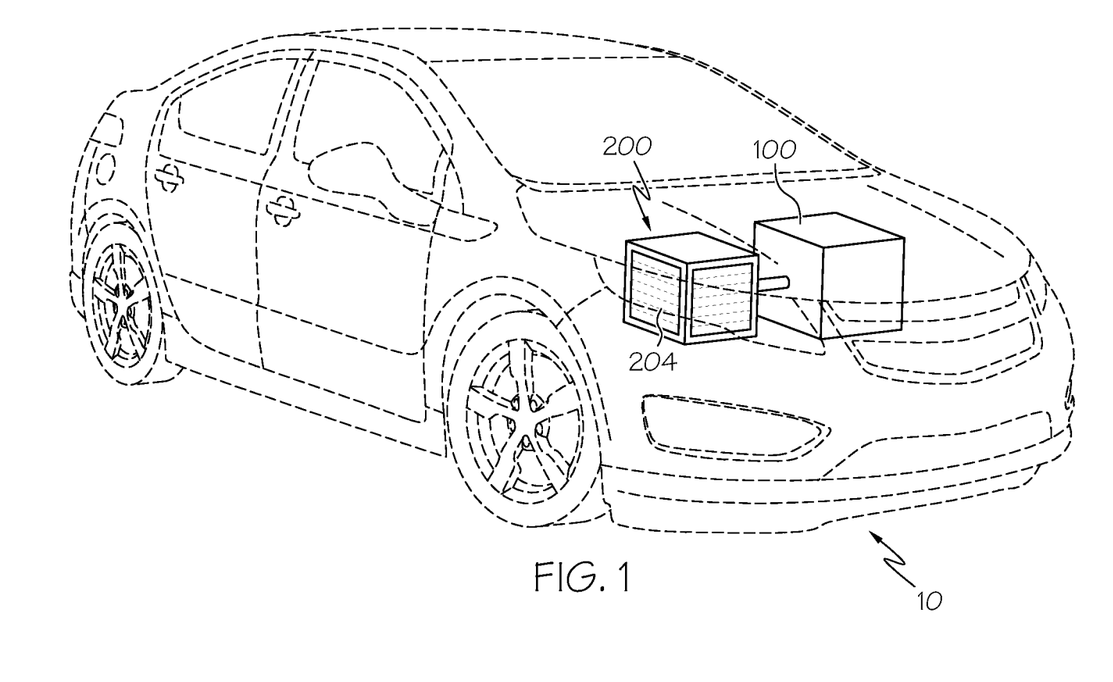
FIG. 1 is a schematic illustration of a vehicle having a fuel cell system.

Referring now to FIG. 1, vehicle 10 (for example, a car, bus, truck or motorcycle) is powered by a fuel cell system 200 that utilizes one or more fuel cell stacks 204 that convert stored gaseous fuel into electricity to provide electric power to engine 100. Engine 100, which may be a fully electric or a hybrid electric engine (e.g., an engine that uses both electricity and petroleum-based combustion for propulsion power), utilizes the power from fuel cell system 200 to propel vehicle 10. Fuel cell system 200 may include one or more hydrogen storage tanks (not shown) to contain the hydrogen-based fuel. As mentioned above, fuel cell system 200 may also include any number of valves, compressors, tubing, temperature regulators, electrical storage devices (e.g., batteries, ultracapacitors or the like, none of which are shown), and controller to deliver the fuel from the tank or tanks to the fuel cell system 102, as well as to provide control over the operation of fuel cell system 200. Such controller will be discussed in more detail below.

Any number of different types of fuel cells (e.g., metal hydride fuel cells, alkaline fuel cells, electrogalvanic fuel cells, or any other type of known fuel cells) may be used in fuel cell system 200. Multiple fuel cells may also be combined in series and/or parallel within fuel cell system 200 as a fuel stack, in order to produce a higher voltage and/or current yield by fuel cell system 200. The produced electrical power may then be supplied directly to engine 100 or stored within an electrical storage device for later use by vehicle 10.

Figure 2:
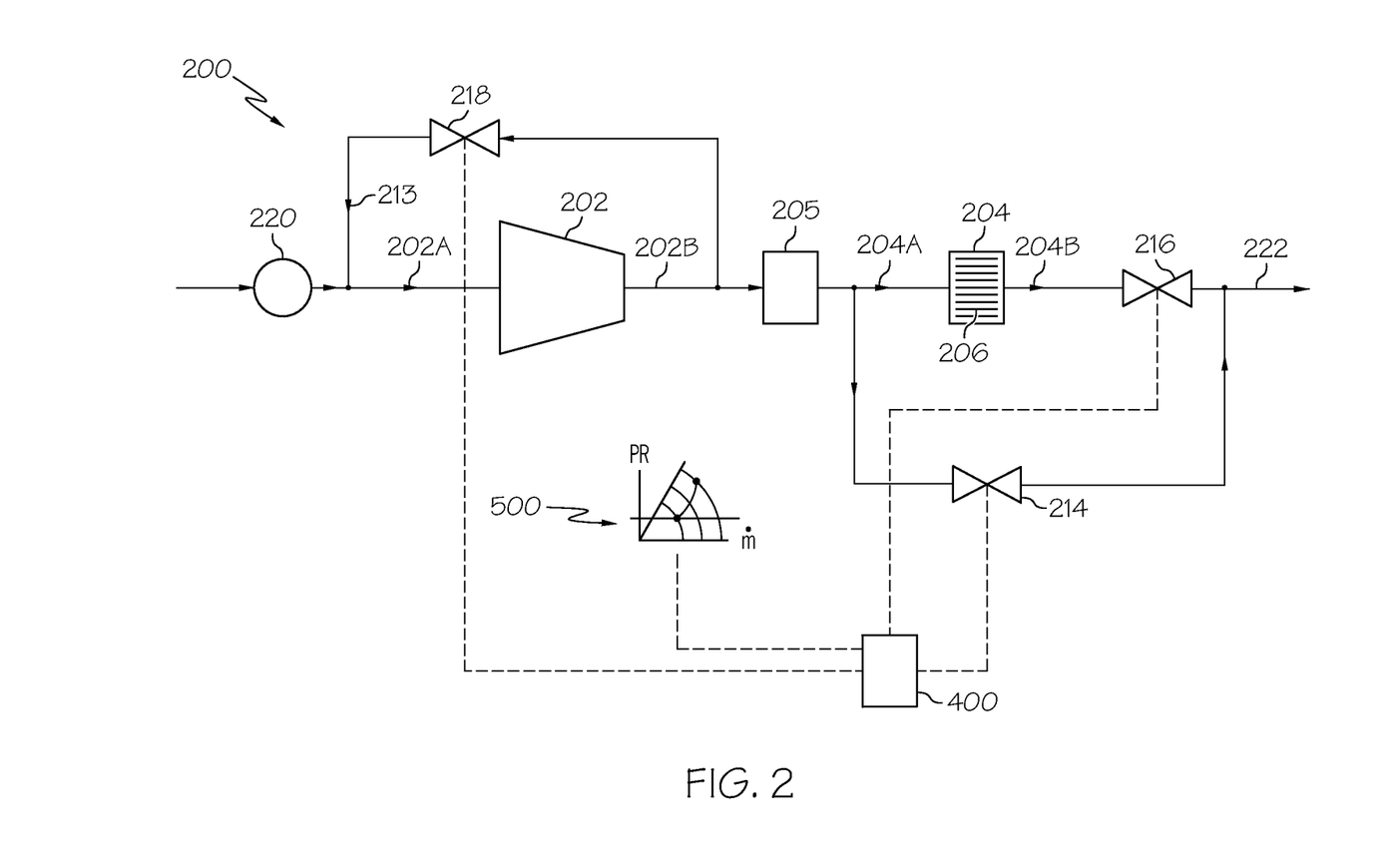
FIG. 2 is a schematic illustration of the air supply system and its interconnection with the vehicle fuel cell system shown in FIG. 1.

Referring next to FIG. 2, a schematic illustration of a portion of an air supply system in the fuel cell system 200 that is used to transport one of the reactants (specifically, air) is shown. Air is received from the air intake system and is supplied to the cathode inlet 204A of fuel cell stack 204, where it is used as a reactant in the various cells 206 within the stack 204. Exhaust gas and/or liquids are then removed from the cathode through outlet 204B and then through cathode backpressure valve 216 (which may also function as an exhaust valve) to be discharged from system 200 through exhaust 222. Additional unreacted gas is removed through the bypass valve 214, which may be used, for example, to dilute the hydrogen left in the cathode of fuel cell stack 204 for catalytic heating as a way to reduce the emissions from the stack 204 during warm-up. In addition, bypass valve 214 may be opened for volt suppression to let compressor 202 sink the load (not shown) of stack 204. As with the exhaust fluids mentioned above, the bypassed gas may be discharged from system 200 via exhaust 222. Fuel cell system 200 may include numerous other valves or components to help control the flow and pressure of the reactant flowing through stack 204. For example, a recirculation valve 218 that operatively connects outlet 202B and inlet 202A of compressor 202 as a way to control the flow of gas to fuel cell stack 204 is also shown. While the recirculation valve 218 is shown in the context of the cathode side of a fuel cell, it will be appreciated by those skilled in the art that a comparable valve could be used on the anode side as well. In a preferred form, control of recirculation valve 218 is based on known performance metrics (such as those associated with compressor 202, which may be in the form of a compressor map 500 or the like). Such control is preferably based in controller 400 that is discussed in more detail below. When open, recirculation valve 218 reroutes compressed gas from outlet 202B of compressor 202 back to inlet 202A through recirculation loop 213.

Cathode backpressure valve 216 is used to regulate pressure in the cathode flowpath exhaust from the outlet 204B of fuel cell stack 204. Cathode backpressure valve 216 is configured to cooperate with bypass valve 214 as a way to simultaneously provide flow and pressure regulation of cathode reactant through stack 204. As will be discussed in more detail below, input parameters upon which the cooperation of the backpressure and bypass valves 216, 214 depend may include various temperature, pressure and set point conditions. These and other parameters (such as those associated with enabling or disabling functions of controller 400) may be used to vary the operation of system 200. Furthermore, although much of the control logic described herein is for control over the backpressure valve 216 and bypass valve 214, it will be appreciated by those skilled in the art that additional control logic may be employed to effect control of the compressor 202 and recirculation valve 218 for other functions, such as controlling surge in compressor 202.

The amount of reactant gas to be provided to the fuel cell system 200 may be determined by the cooperation of the backpressure valve 216 and the bypass valve 214, where consideration is given to modifying the pressure and flow setpoints through the inclusion of a system flow storage (i.e., capacitance) term, also referred to herein as an offset term. The inclusion of such a term allows the controller 400 to effectively count or otherwise quantify reactant molecules present in the system 200 as a predictive way to improve valve control, especially during transient system operation. In general, this predictive component stems from the use of a feedforward-based control strategy in conjunction with a proportional-integral (PI) or proportional-integral-digital (PID) feedback-based component. Since the effects of regulating the bypass valve 214 and the backpressure valve 216 are interrelated, control over one may be integrated into the other. In the present context, the instructions or related information being provided to various pressure drop and valve position models are deemed to be feedforward-based, even if they include a feedback component (such as the aforementioned stack pressure feedback term), so long as at least most of the control strategy is based on the feedforward (rather than feedback) terms. In other words, the presence of a discrete feedback term is not destructive of the overall feedforward-based strategy.

Cathode air cooler (CAC) 205 is a heat exchanger that in most operating modes removes the heat of compression from the incoming air going to stack 204. CAC 205 may also be used in cold ambient conditions to heat up the air entering stack 204 to prevent icing. Although the inlet to bypass valve 214 is shown as being fluidly connected between the outlet 202B of compressor 202 and the inlet CAC 205, it will be appreciated by those skilled in the art that it may also be connected to the stack inlet 204A such that it is downstream of the CAC 205.

Fuel cell system 200 further includes a number of sensors that measure the characteristics of the gas within it. For example, fuel cell system 200 may include flow meter 220 that measures the mass air flow, such as from an air intake. It will be appreciated by those skilled in the art that other sensors (not shown) may be employed in fuel cell system 200 to measure various input parameters such as flows, pressures, temperatures, densities or the like. By way of additional example, while pressure sensors may be used (for example, at the inlet or outlet of backpressure valve 216), they do introduce extra system complexity and cost. A pressure model may be used to estimate such pressures, if desired. Any such pressure sensor is only capable of measuring the pressure in the system; it can not predict pressure in the system. As such, any such sensor reading can only be used in the feedback control and not in a feedforward (predicted) path. Further examples of possible sensors in fuel cell system 200 include sensors that measure the valve positions of valves 214, 216, 218 and the speed of compressor 202, as will be understood by those skilled in the art. Such sensed values may be used by controller 400 as input or a related parameter.

Figure 3A:
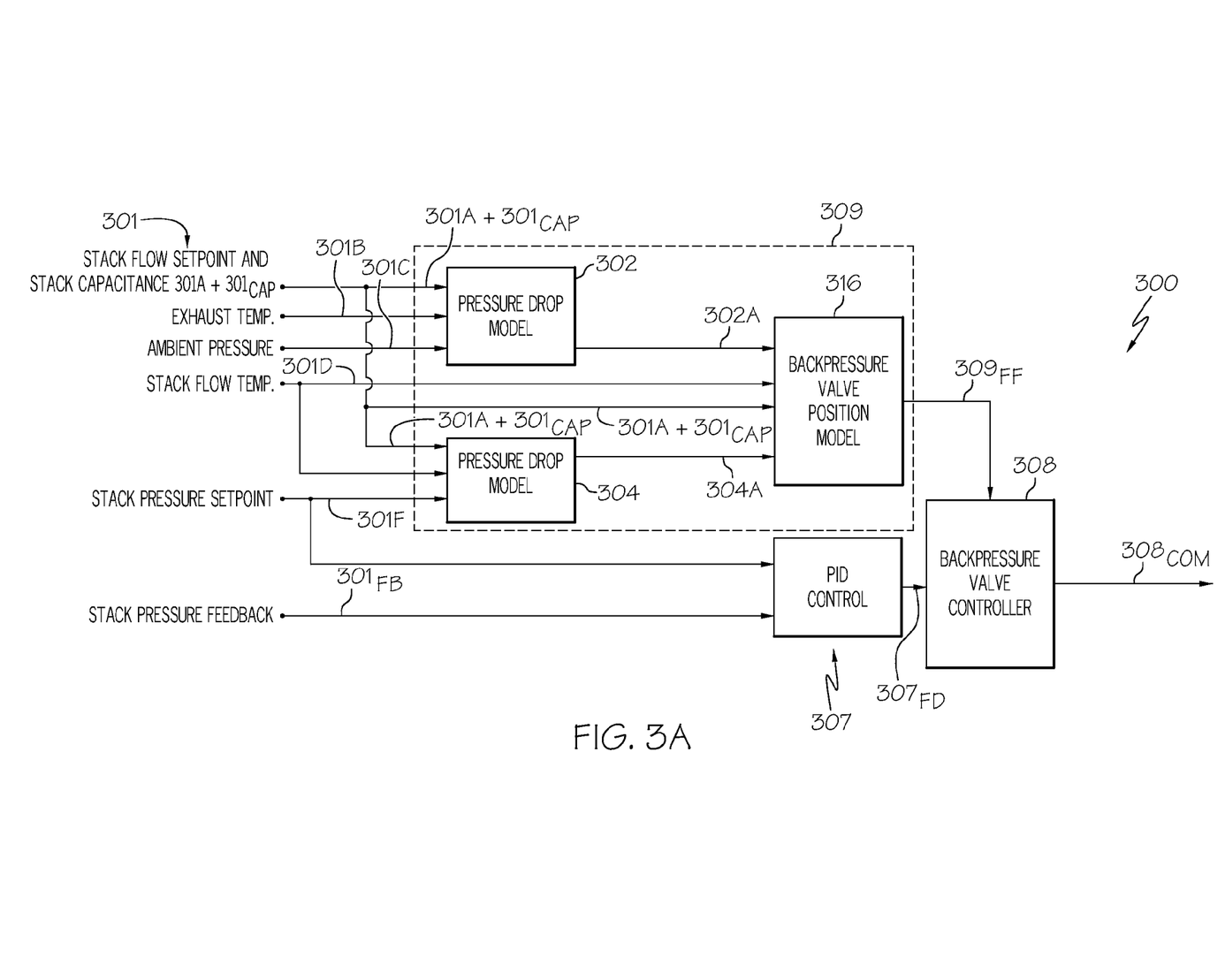
FIG. 3A is an illustration of a portion of a strategy for controlling stack pressure through a cathode backpressure valve of the vehicle fuel cell system of FIG. 1 where a capacitance term is included to offset flow variations.

Referring next to FIG. 3A in conjunction with FIG. 2, operational transients in fuel cell system 200 include power change needs from the stack 204; such changes produce comparable changes in airflow to the cathode. In the present context, airflow corresponds to that reactant configured to pass through the cathode portion (or portions) of the fuel cell system 200, while fuel flow corresponds to that reactant configured to pass through the anode portion (or portions) of the fuel cell system 200. To promote operational stability, it is important to quickly reconfigure the airflow pressure to the stack 204. FIG. 3A shows an algorithm (also referred to herein as control strategy, or more simply strategy) 300 for control the cathode backpressure valve 216 to quickly regulate the stack pressure. The algorithm 300 includes a feedforward term (or portion) $309_{ff}$ of the new valve position command and a feedback term (for example, a PI controller term) $307_{fb}$ of the new valve position command. The feedforward portion $309_{ff}$ is calculated based on a feedforward module 309 that is based upon the flow request through the pressure drop models 302, 304, as well as that of the valve position model 316. Based on the feedforward portion $309_{ff}$ and feedback portion $307_{fd}$, the valve final position command term $308_{com}$ is output to change the backpressure valve position. Likewise, numerous inputs 301 are shown, and include various setpoints, as well as measured or sensed values, as well as those fed back into the algorithm 300.

Stabilization of the pressure control signal $308_{com}$ that is output from the cathode portion of stack 204 is achieved primarily through manipulation of the backpressure valve 216 by the feedforward portion $309_{ff}$ with the feedback-based component from $307_{fb}$ relied upon to trim any steady state errors. As such, during transients, the feedforward term $309_{ff}$ is often the only one of the two being utilized. Moreover, the feedback-based term $307_{fb}$, to the extent that it is used, does so only if the pressure error is within certain a predefined threshold. The position of the backpressure valve 216 is calculated based on the requested steady state flow for stack 204; however, during down-transient or up-transient, there is either additional flow into (up-transient) or out of (down-transient) stack 204. As such, the flow through the backpressure valve 216 will be correspondingly lower or higher than the request flow. This in turn would increase the amount of time needed for the controller 400 to adjust the stack 204 pressure to the new pressure setpoint.

Even with these limitations, utilizing feedforward term $309_{ff}$ as part of the control over cathode backpressure valve 216 helps to stabilize the control system better than utilizing a fully closed control loop (e.g., basing the control only on the error between a setpoint and feedback term). In one embodiment, feedforward term $309_{ff}$ may be calculated using output from the pressure drop models 302, 304 and a valve position model 316 for backpressure cathode valve 216. The pressure drop models 302, 304 can be used to predict the pressure at the inlet and outlet of cathode backpressure valve 216 using the stack flow setpoint 301A and the airflow capacitance term (also known as the stack flow offset value or more simply "capacitance term") $301_{cap}$. The predicted pressures at the inlet and outlet of cathode backpressure valve 216 can then be used with the valve position model 316 to determine a feedforward term $309_{ff}$ that corresponds to a new position of the valve.

Figure 3B:
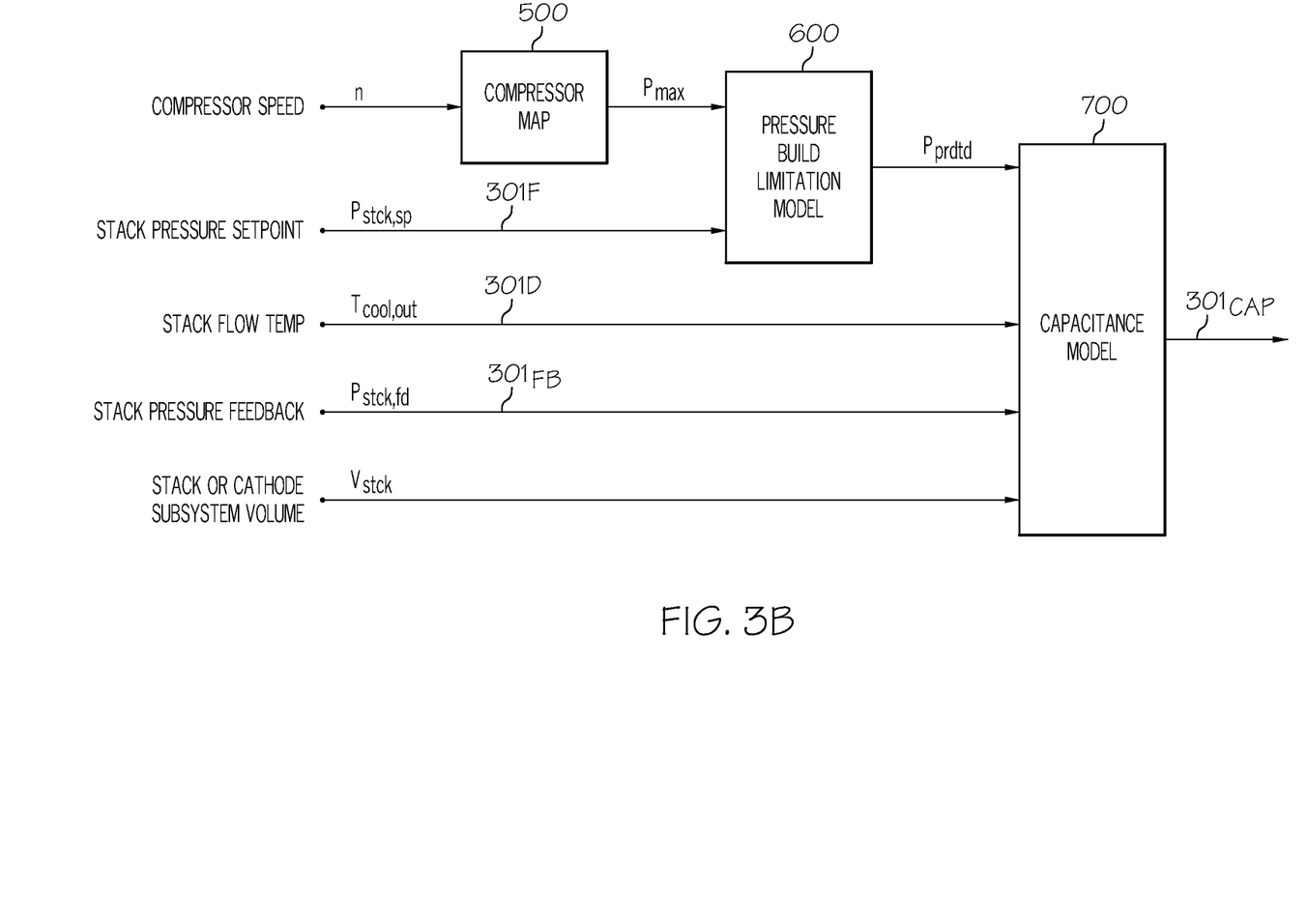
FIG. 3B is an illustration of the various inputs to the capacitance model that is used to generate the capacitance term of FIG. 3A.

Referring to FIG. 3B in conjunction with FIG. 3A, the inclusion of the flow offset capacitance model 700 and related airflow capacitance term $301_{cap}$ that is coupled to the stack flow setpoint 301A as input to both the backpressure valve position model 316 and the pressure drop model 304 provides a flow offset value as a way to correct a setpoint of the stack flow. In essence, this offset means that the flow used in the calculation of the position of the backpressure valve 216 is compensated to take into consideration the capacity of stack 204. As such, the capacitance of the airflow associated with the stack flow offset value $301_{cap}$ is used to account for discrepancies during transients in order to augment the stack flow setpoint 301A.

In general, surge conditions may lead to unnecessary wear in the compressor 202, and as such are preferably avoided. During a surge condition, the pressure differential between the outlet 202B and the inlet 202A of the compressor 202 is such that the compressor 202 cannot force reactant gas through the outlet 202B, leading to flow reversal. In some embodiments of the present invention, a predicted pressure is used by capacitance model 700 instead of the stack pressure setpoint 301F as part of measures taken to avoid a surge condition in the compressor 202. A compressor map 500 depicts the differential pressure between the outlet 202B and inlet 202A of the compressor 202 supplying reactant gas to the fuel cell stack 204 to the flow rate through the compressor 202 at different compressor speeds. A surge line in the map 500 demarcates the operating states in which the compressor 202 is in a surge state from those in which the compressor 202 is functioning normally. Compressor map 500 may be used, for example, to determine if a particular pressure, flow value or compressor speed would result in a surge condition. Moreover, the map 500 may be used to correlate a compressor speed to another operating parameter; such information may be used by the controller 400 to have stack capacitance model values correspond to a pressure change in the fuel cell stack, a flow temperature in the fuel cell stack, a fuel cell stack volume and a predicted pressure in the fuel cell stack, where the pressure parameters may be based on a compressor speed derived from the compressor map. A more detailed discussion of the compressor map 500 may be found in U.S. application Ser. No. 13/660,083 entitled REACTIVE COMPRESSOR SURGE MITIGATION STRATEGY FOR A FUEL CELL POWER SYSTEM which is assigned to the assignee of the present invention and is also hereby incorporated by reference.

FIG. 3B also illustrates the details of a portion of strategy 300 concerned with providing values for use by capacitance model 700 for controlling cathode backpressure valve 216. Once surge-prone operating conditions are avoided (based, for example, on information from compressor map 500), pressure build limitation model 600 may be used to predict the desired cathode inlet pressure by comparing the stack pressure setpoint 301F to the maximum pressure from compressor map 500. If the stack pressure setpoint 301F exceeds the maximum pressure, the maximum pressure is used to predict the desired pressure. Otherwise, the stack pressure setpoint 301F is used.

The capacitance model 700 makes use of the Ideal Gas Law to determine the stack flow offset value (which may also be referred to herein as the capacitance correction term, or more simply, the capacitance term) as follows:

$$dm_{offset} = \frac{(p_{stck,fd} - p_{prdtd}) * V}{R * T_{stck}} \cdot M_{air}$$

where $dm_{offset}$ is the capacitance term $301_{cap}$ that corresponds to the stack flow offset value, R is the ideal gas constant, $T_{stck}$ is the stack flow temperature 301D, V is the volume of the stack or the cathode subsystem, $M_{air}$ is the flow molecular weight, $p_{stck,fd}$ is the stack pressure feedback $301_{fb}$, and $p_{rdtd}$ is a predicted pressure from pressure build limitation model 600. In a preferred form, this capacitance term $301_{cap}$ adjustment is utilized when the pressure control of stack 204 is in a transient state (e.g., while the system adjusts to meet a new stack pressure setpoint), although it will be appreciated by those skilled in the art that it may be used in steady state conditions as well.

Referring again to FIG. 3A, control strategy 300 utilizes a backpressure valve command 308 to control the position of a cathode backpressure valve 216 to achieve a stack pressure setpoint 301F. Backpressure valve command 308 may be generated by any control loop mechanism that incorporates both feedback and a feedforward term. For example, backpressure valve command 308 may be a feedforward term plus a PI or PID control loop term. As shown, backpressure valve command 308 is output to control the position of the valve 216 using a stack pressure setpoint 301F, a stack pressure feedback value $307_{fb}$, as well as a feedforward value $309_{ff}$ determined using additional information about the fuel cell system 102. For example, pressure drop models 302, 304 are used to predict the pressure at the inlet and outlet of the cathode backpressure valve 216 based on such additional information. Pressure drop model 302 predicts the pressure at the outlet of the cathode backpressure valve using the exhaust flow temperature 301B and the ambient pressure 301C; both of these values may be measured by conventional means, such as sensors. Additional input includes the stack flow setpoint 301A and the capacitance term associated with the stack flow offset value $301_{cap}$.

Pressure drop model 304 is used to predict the pressure at the inlet of the backpressure valve 216 using the temperature of the stack 301D and the stack pressure setpoint 301F. Pressure drop model 304 also uses the stack flow setpoint 301A and the capacitance term $301_{cap}$, which is the stack flow offset value calculated using the capacitance adjustment of FIG. 3B in order to account for discrepancies during transient conditions. The stack flow temperature 301D and the stack flow setpoint 301A and the capacitance term $301_{cap}$ are used with pressure drop model 304 to determine the pressure drop between the inlet of the cathode and the inlet of the backpressure valve 216. The predicted backpressure valve inlet pressure 304A is then determined by subtracting the calculated pressure drop from the stack pressure setpoint 301F.

Cathode backpressure valve model 316 utilizes the predicted pressures at the inlet and outlet of the backpressure valve 216, the stack flow temperature 301D, and the stack flow setpoint 301A and the capacitance term $301_{cap}$ to determine the feedforward value of the new backpressure valve 216 position $309_{ff}$. The feedforward value $309_{ff}$ is then used together with the feedback term of the new valve position $307_{fd}$ to generate a cathode backpressure valve control command signal $308_{com}$ that causes the valve 216 to change positions. Oscillation due to the coupling of the cathode flow and pressure is mitigated by the use of the feedforward value as part of the control over the backpressure valve 216.

Figure 4:
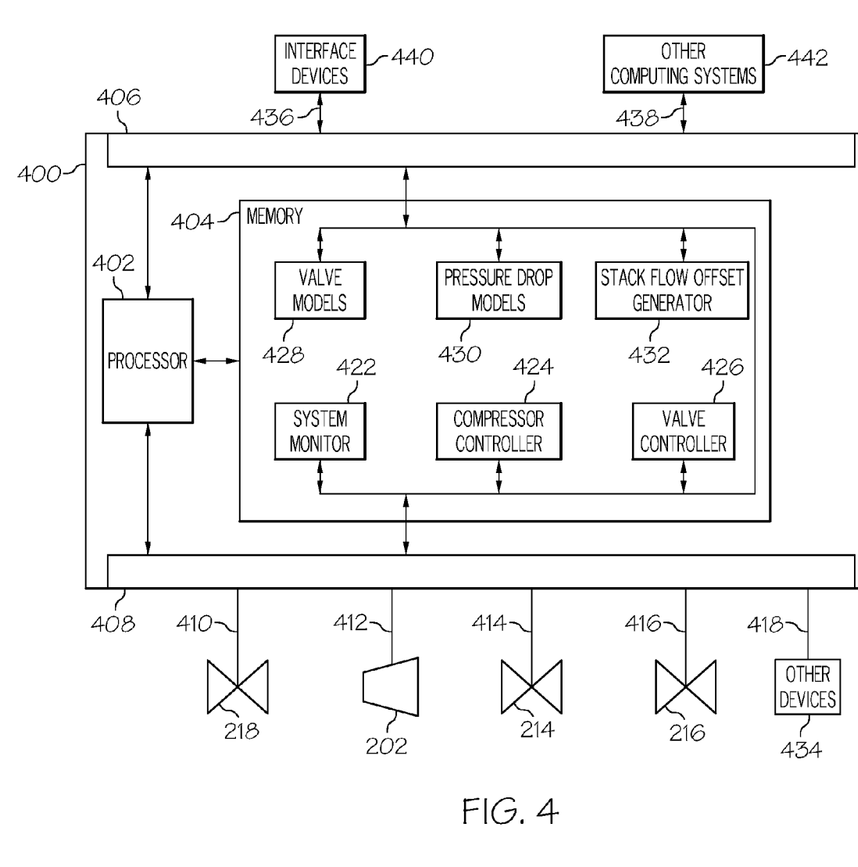
FIG. 4 is a schematic illustration of a controller for the vehicle fuel cell system of FIG. 1.

Referring now to FIG. 4, a schematic for a controller 400 for a vehicle fuel cell system 102 is shown, according to embodiments shown and described herein. As shown, controller 400 provides control over the various devices of fuel cell system 102. Controller 400 includes processor 402, which may be one or more processors (e.g., a microprocessor, an application specific integrated circuit (ASIC), field programmable gate array, or the like) communicatively coupled to memory 404 and interfaces 406 and 408. Memory 404 may be any form of memory capable of storing machine-executable instructions that implement one or more of the functions disclosed herein, when executed by processor 402. For example, memory 404 in a preferred form may be a RAM, ROM, flash memory, hard drive, EEPROM, CD-ROM, DVD, other forms of non-transitory memory devices, or any combination of different memory devices. In one form, controller 400 may function as a data processing or computer system with its processor, input, output, and memory, where the latter may be used to temporarily or permanently store codes, programs, models or related algorithms such that the instructions contained in the code are operated upon by the processor based on input data such that output data generated by the code and the processor can be conveyed to another program, user or component (such as the backpressure valve) via output. A data bus or related set of wires and associated circuitry forms a suitable data communication path that can interconnect the various components of controller 400, as well as any peripheral equipment in such a way as to permit the system to operate as an integrated whole. It will be appreciated by those skilled in the art that so configured, controller 400 is possessive of a von Neumann architecture.

Controller 400 communicates with various devices in fuel cell system 200 and, in some cases, provides control over the devices. In some embodiments, controller 400 provides either direct or indirect control over compressor 202, cathode backpressure valve 216, and/or other devices 434 (e.g., sensors in fuel cell system 102, other valves, or the like). Controller 400 receives, either directly or indirectly, sensor measurements from fuel cell system 102 to monitor the operation of the system. For example, controller 400 may receive temperature, pressure, flow, density, valve position, speed, or other measurements from sensors associated with compressor 202, and/or cathode backpressure valve 216. In addition, controller 400 may also receive sensor readings from other devices 434 (e.g., flow meter, sensors associated with fuel cell stack 204, or the like). It should be appreciated that any number of different combinations of sensors and sensor configurations may be used, without deviating from the principles or teachings of the present disclosure.

Connections 410, 412, 414, 416, and 418 may be any combination of hardwired or wireless connections that provide connections between controller 400 and, recirculation valve 218, compressor 202, bypass valve 214, cathode backpressure valve 216, and other devices 434, respectively. For example, connection 410 may be a hardwired connection, while connection 412 may be a wireless connection. In some embodiments, connections 410, 412, 414, 416, and 418 are part of a shared data line that conveys measurement data to controller 400 and control commands to the devices of fuel cell system 102. In yet other embodiments, connections 410, 412, 414, 416, and 418 may include one or more intermediary circuits (e.g., other microcontrollers, signal filters, etc.) and provide an indirect connection between controller 400, compressor 202, bypass valve 214, recirculation valve 218, cathode backpressure valve 216, and other devices 434.

Interface 408 is configured to receive measurement data and to transmit control commands to recirculation valve 218, compressor 202, bypass valve 214, cathode backpressure valve 216, and other devices 434. For example, interface 408 may include one or more wireless transceivers, if any of connections 410, 412, 414, 416, and 418 are wireless connections. Interface 408 may also include one or more wired ports, if any of connections 410, 412, 414, 416, and 418 are wired connections. Interface 408 may also include circuitry configured to digitally sample or filter received measurement data. For example, interface 408 may sample temperature data received from a temperature sensor of compressor 202 via connection 412 at discrete times (e.g., k, k+1, k+2, etc.) to produce discrete temperature values (e.g., T(k), T(k+1), T(k+2), etc.).

In some embodiments, controller 400 may also communicate with interface devices 440 (e.g., a display, a speaker, a printer, or any other electronic device that provides and/or receives data to and from a user) via connection 436. Controller 400 may further communicate with other computing systems 442 (e.g., another controller, a portable electronic device, a server, or the like) via connection 438. Connections 436 and 438 may be wired and/or wireless connections. For example, other computing systems 442 may include a server located remotely from vehicle 100 and connection 438 may be a wireless connection. For example, controller 400 may communicate status condition information to the server in other computing systems 442 via a cellular, WiFi, radio, satellite connection, or the like. Interface 406 may also include one or more transceivers configured to send and receive location information for vehicle 100. For example, interface 406 may include a GPS receiver or cellular receiver that utilizes triangulation to determine the location of vehicle 100. In other embodiments, interfaces 406 and 408 may be a single interface for controller 400.

Memory 404 is shown to include system monitor 422 that receives sensor measurements from sensors associated with fuel cell system 102 (e.g., recirculation valve 218, bypass valve 214, cathode backpressure valve 216, compressor 202, and other devices 434). Sensor measurement may include, for example, measurements of temperature, pressure, or gas flow. According to some embodiments, system monitor 422 may receive the gas flow measurement from flow meter 220 (e.g., which may be part of other devices 434), the pressure and temperature at inlet 202A of compressor 202, the pressure and temperature at outlet 202B of compressor 202, and/or the gas flow through compressor 202. System monitor 422 may also receive measurements of the pressure, temperature, and/or gas flow into and/or out of fuel stack 204, cathode backpressure valve 216, recirculation valve 218, bypass valve 214, and/or exhaust 222.

In some embodiments, memory 404 also includes compressor controller 424 that receives measurement data from system monitor 422 and uses the measurement data to provide control over compressor 202. For example, compressor controller 424 may generate a compressor control command signal that causes compressor 202 to change its operating state, such as its speed. Compressor controller 424 may additionally or alternatively provide data to valve controller 426, which controls the position of backpressure valve 216. In some cases, compressor controller 424 may utilize a compressor map that relates the differential pressure (e.g., the difference between pressures at inlet 202A and outlet 202B of compressor 202), the gas flow through compressor 202, and the speed of compressor 202. Such a map may be utilized by compressor controller 424 to avoid and/or mitigate surge conditions.

Memory 404 may also include valve controller 426, which provides control over cathode backpressure valve 216, and/or the other valves. Valve controller 426 may receive measurement data from system monitor 422 and/or data from compressor controller 424 and utilize one or more control loops to generate valve control commands that regulate the valves of fuel cell system 102. In some embodiments, valve controller 426 implements the one or more control loops as part of an integrated control strategy, such as control strategy 300. For example, valve controller 426 may utilize a feedforward or/and feedback control loop to control cathode backpressure valve 216.

Valve controller 426 may also utilize pressure drop models 430 as part of its control over the valves of fuel cell system 102. In cases where pressure sensors are impractical or not used at a specific point in fuel cell system 102, pressure drop models 430 may be used to predict the pressure at that point. Pressure drop models 430 may utilize measurement data from system monitor 422 as part of the prediction. In some cases, pressure drop models 430 may also utilize setpoint and/or feedback data from compressor controller 424 or valve controller 426 as part of the pressure prediction. In one embodiment, pressure drop models 428 may be used to predict the inlet and outlet pressure of cathode backpressure valve 216. For example, ambient pressure and exhaust temperatures from system monitor 422, as well as the stack flow setpoint 301A and the capacitance term $301_{cap}$, may be used by pressure drop models 430 to determine a predicted pressure at the outlet of backpressure valve 216.

In some embodiments, valve controller 426 may use the predicted pressures from pressure drop models 430 with valve models 428 to determine a feedforward term of the new position for cathode backpressure valve 216. Valve controller 426 may also utilize an error between stack pressure feedback value and stack pressure setpoint value to generate a feedback term of the new valve position for cathode backpressure valve 216. Valve controller 426 may also utilize the feedforward term and the feedback term to generate a valve control command signal that causes cathode backpressure valve 216 to change positions to approach a stack pressure setpoint 301F.

Memory 404 may also be configured to include stack flow offset generator 432 that utilizes the strategy discussed herein to generate a stack flow offset value $301_{cap}$ shown in FIG. 3B to offset the signal corresponding to the stack flow setpoint 301A value as a way to control cathode backpressure valve 216. If compressor controller 424 includes a compressor map, stack flow offset generator 432 may use the speed of compressor 202 with the compressor map to determine a maximum pressure value that does not cause compressor 202 to surge. Stack flow offset generator 432 may also include a pressure build limitation model that compares the maximum pressure to the stack pressure setpoint 301F to determine a predicted pressure. Stack flow offset generator 432 then utilizes the predicted pressure, the stack flow temperature, the stack volume, and the stack pressure feedback 301$_{fb}$ with a capacitance model 700 to generate a stack flow offset value 301$_{cap}$.

The stack flow offset value 301$_{cap}$ from stack flow offset generator 432 is added to the stack flow setpoint value 301A used with pressure drop models 430 to determine the feedforward value 309$_{ff}$ used by valve controller 426. In some embodiments, the stack flow offset value 301$_{cap}$ may be automatically added to the stack flow setpoint value 301A by valve controller 426. In other embodiments, valve controller 426 may only add the stack flow offset value 301$_{cap}$ to the stack flow setpoint value 301A when the stack pressure setpoint 301F changes (e.g., during transient conditions).

Although controller 400 is shown in FIG. 4 as a singular device, it is to be understood that this is merely exemplary and is not intended to be limiting. For example, processor 402 may include any number of processors of any number of computing devices that execute the instructions stored in memory 404. Likewise, memory 404 may include any number of memory devices and is not limited to memory devices located within the same housing as processor 402. In some cases, processor 402 and/or memory 404 may even be located external to vehicle 100.

Figure 5A:
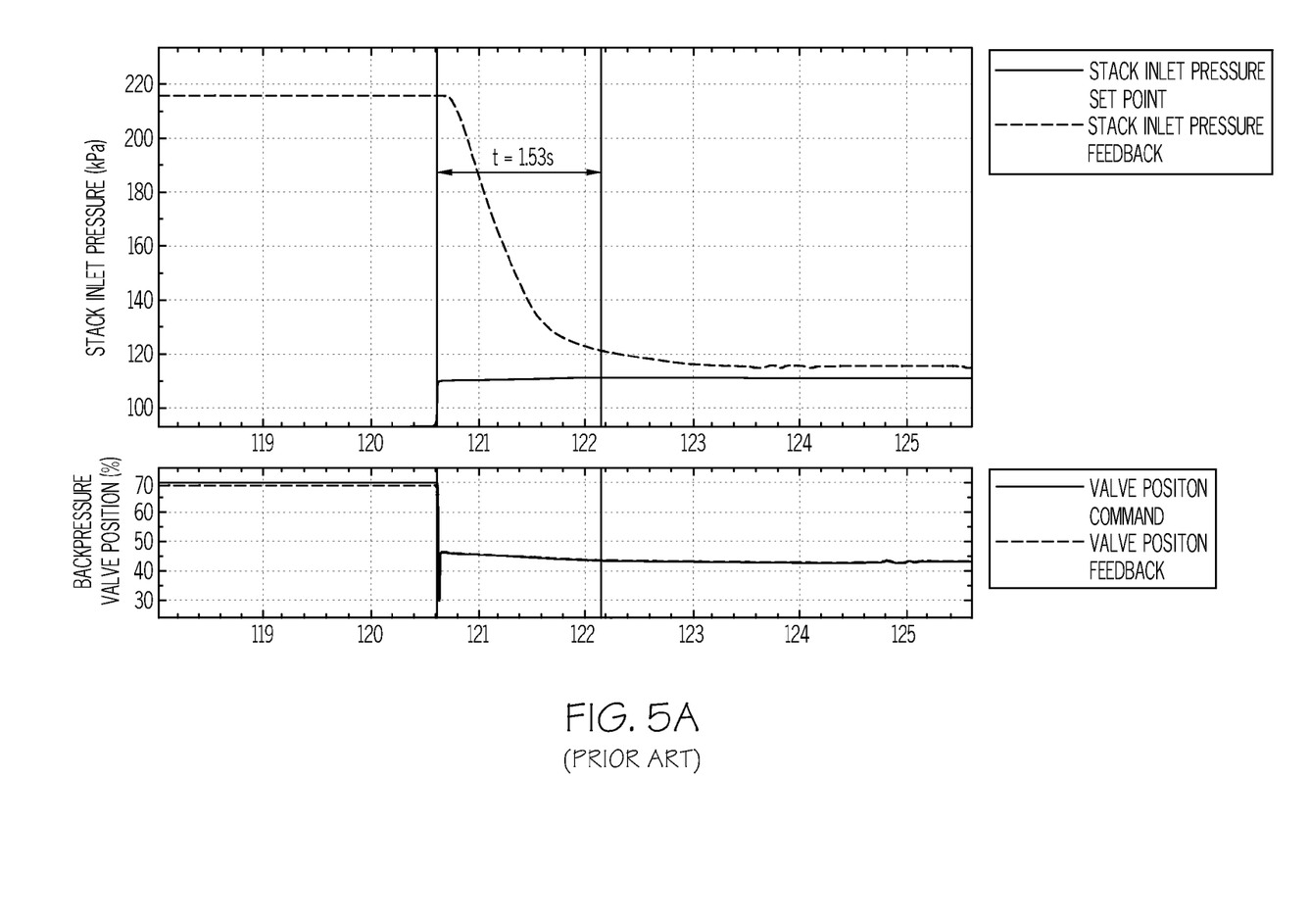
FIG. 5A shows a pressure control for a down transient according to the prior art.
Figure 5B:
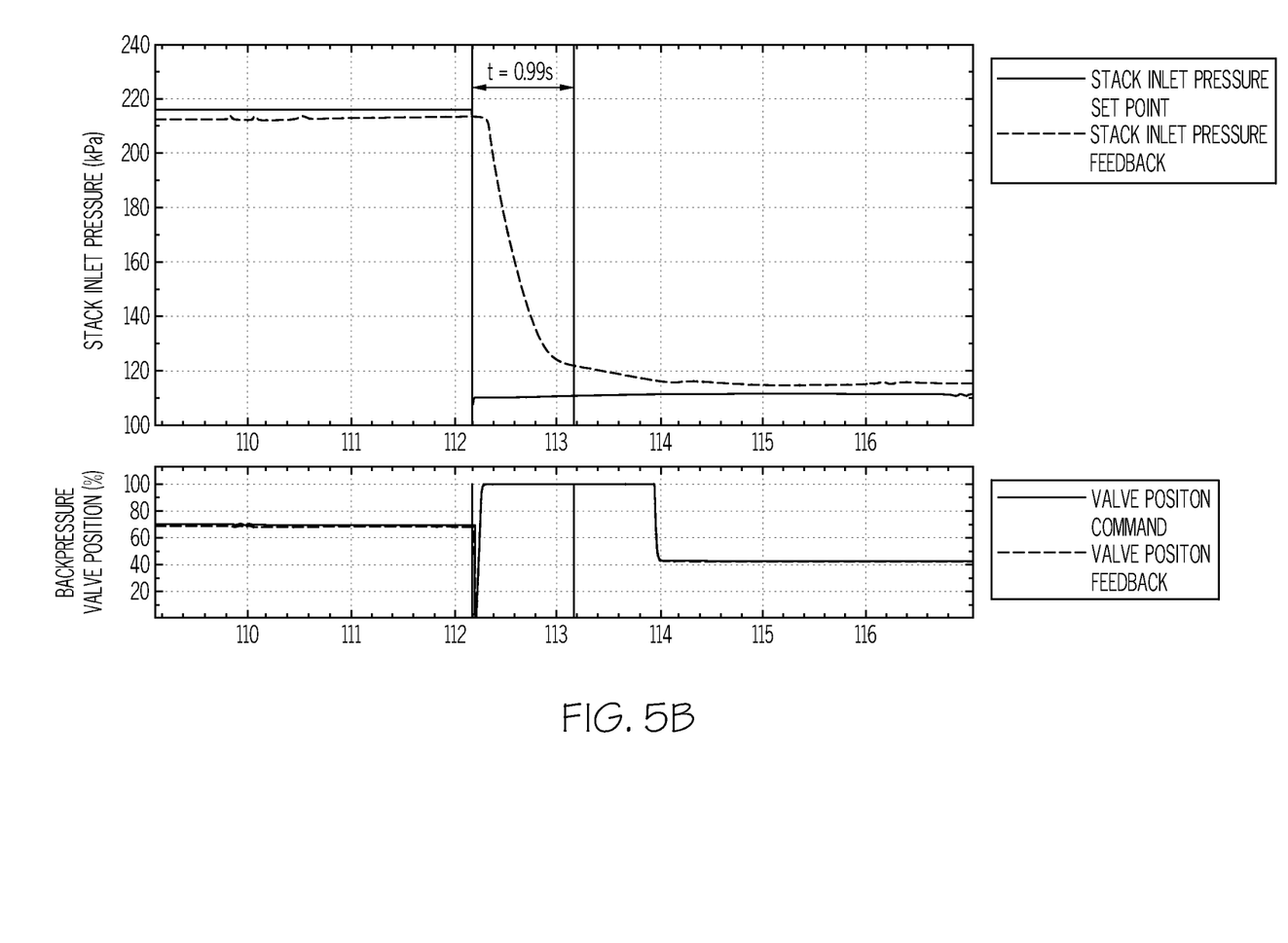
FIG. 5B shows a pressure control for a down transient according to the present invention.

Referring next to FIGS. 5A, 5B, 6A and 6B, comparisons between systems based on the prior art and the present invention are depicted for down-transients and up-transients. Referring with particularity to FIGS. 5A and 5B, the stack inlet pressure feedback (shown by the dashed lines) relative to the solid line that is indicative of the backpressure valve position setpoint is shown for a pressure control comparison involving a large down-transient, where FIG. 5A is for the situation without a capacitance model of the present invention and FIG. 5B is for the situation with the capacitance model. In either case, the cathode backpressure valve 216 is commanded to move to meet the new stack pressure setpoint 301F. More particularly, the top plot in FIG. 5A is for the stack inlet pressure, while the bottom plot is for the backpressure valve position. Referring with particularity to FIG. 5B relative to the scenario depicted in FIG. 5A, the T90 time is improved over 30%, dropping from 1.53 seconds to 0.99 second.

Figure 6A:
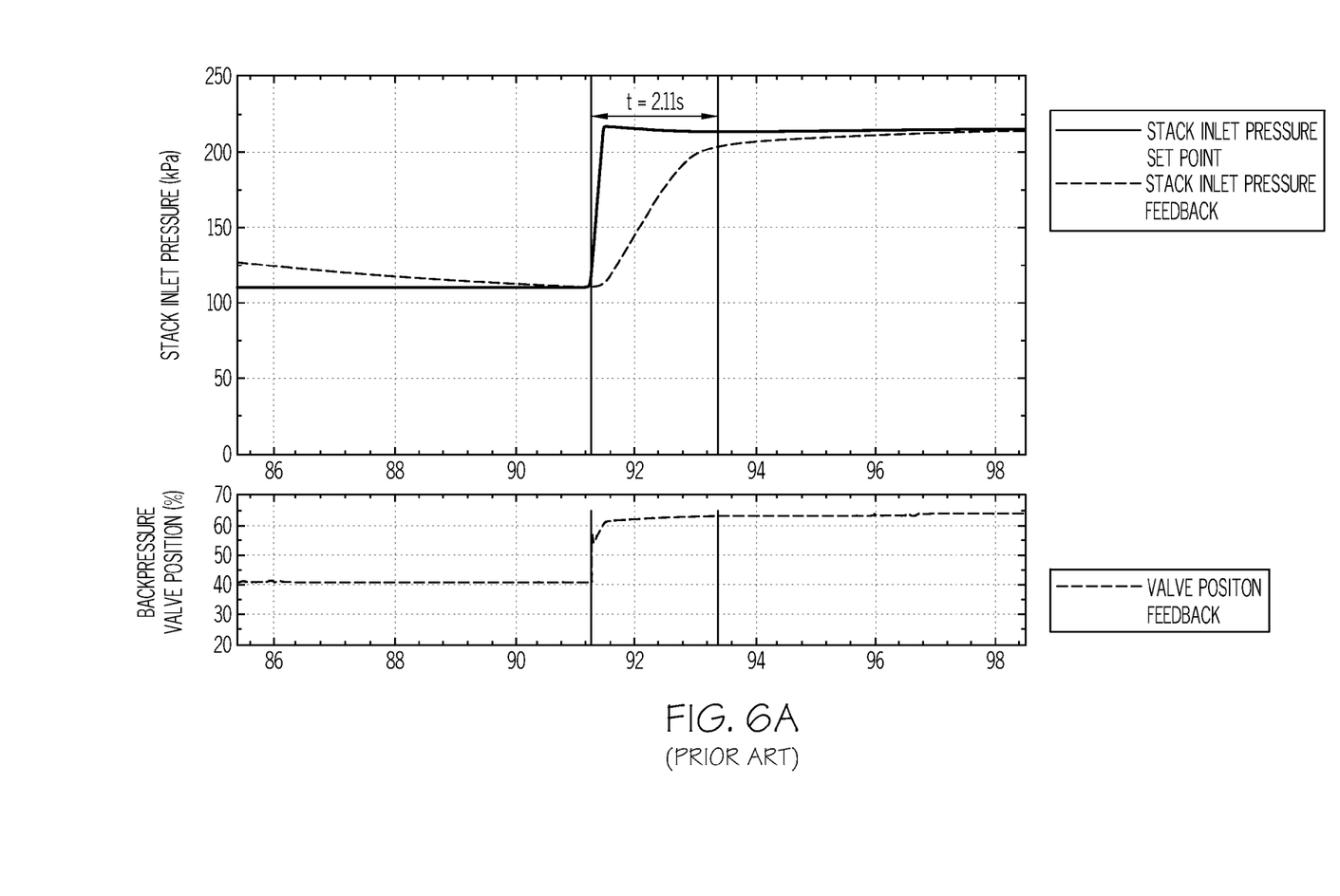
FIG. 6A shows a pressure control for an up transient according to the prior art.
Figure 6B:
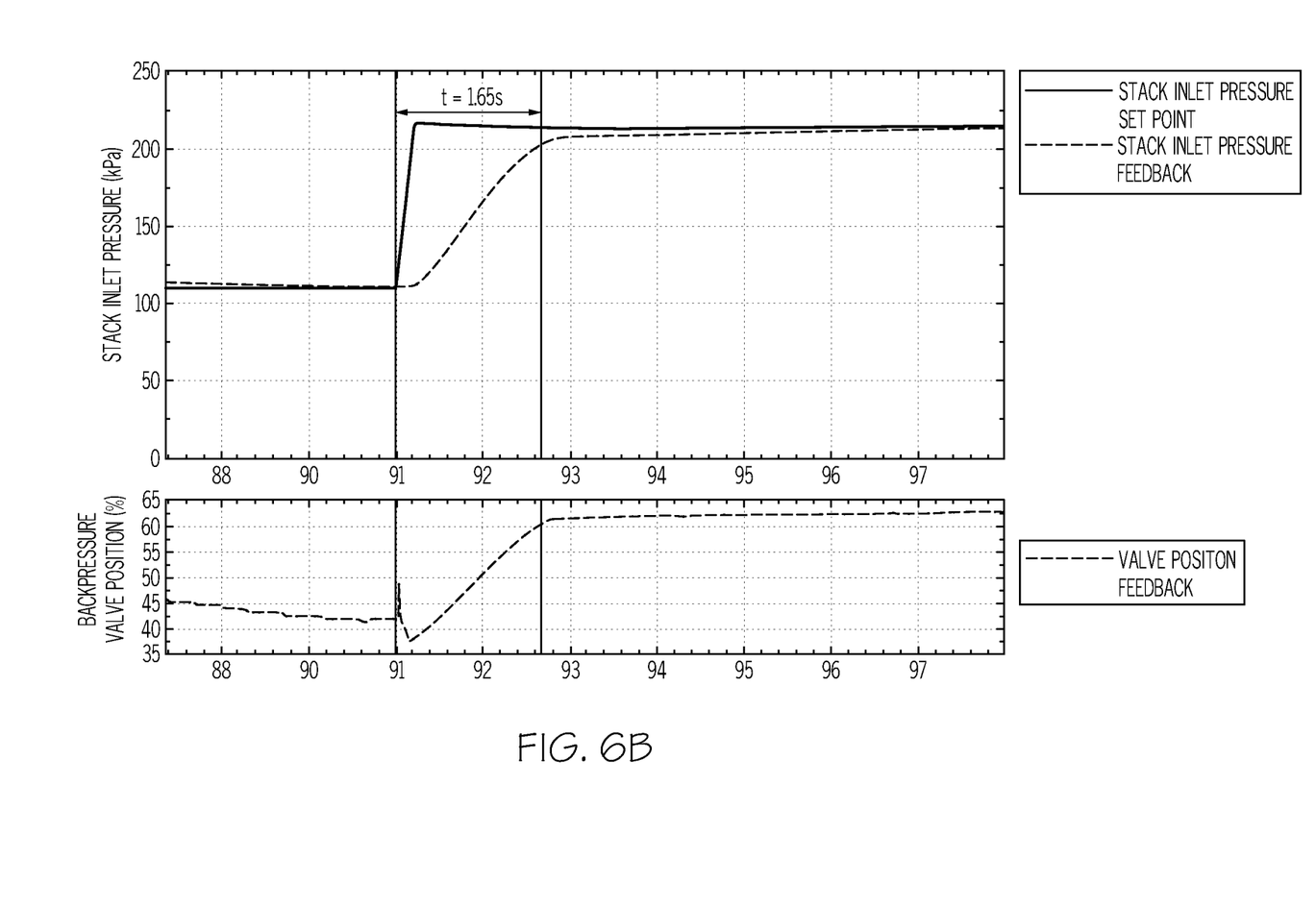
FIG. 6B shows a pressure control for an up transient according to the present invention.

Likewise, FIGS. 6A and 6B show the pressure control comparison for a large up-transient without (FIG. 6A) and with (FIG. 6B) the capacitance model. In particular, the solid line in the upper plot of FIGS. 6A and 6B is the stack inlet pressure setpoint, and the dashed line in the upper plots is the stack inlet pressure feedback. Likewise, the dashed line in the lower plot of FIGS. 6A and 6B is the backpressure valve position. FIG. 6B shows that with the capacitance model, the cathode backpressure valve 216 is commanded to close and then open during an up-transient as a way to fill the stack 102 to its capacity with an improved T90 time, in this case over 20% from 2.11 seconds to 1.65 seconds.

Many modifications and variations of embodiments of the present invention are possible in light of the above description. The above-described embodiments of the various systems and methods may be used alone or in any combination thereof without departing from the scope of the invention. Although the description and figures may show a specific ordering of steps, it is to be understood that different orderings of the steps are also contemplated in the present disclosure. Likewise, one or more steps may be performed concurrently or partially concurrently.

What is claimed is:

1. A fuel cell system comprising:
a fuel cell stack;
a backpressure valve in fluid communication with an outlet of the fuel cell stack; and
a controller comprising at least one processor, an input, and output and a memory, the memory configured to store instructions related to a plurality of models comprising a plurality of pressure drop models, a stack capacitance model and a valve position model, the controller is programmed to execute the instructions in memory to generate a command signal to regulate the position of the backpressure valve, the command signal comprising a feedforward component and a feedback component where the feedforward component is determined using output from the valve position model that has been modified by the stack capacitance model and at least one of the plurality of pressure drop models, wherein the stack capacitance model modifies the output based on the Ideal Gas Law according to:

$$dm_{cap} = \frac{(p_{stck,fd} - p_{prdtd}) * V}{R * T_{stck}} \cdot M_{air}$$

where dm$_{cap}$ is an offset term to modify the stack flow setpoint signal, R is gas constant, T$_{stck}$ is the stack flow temperature, V is the volume of the fuel cell stack and M$_{air}$ is the airflow molecular weight.

2. The system of claim 1, wherein the capacitance model is configured to receive as input values corresponding to a pressure change in the fuel cell stack, flow temperature in the fuel cell stack, a fuel cell stack volume and a predicted pressure in the fuel cell stack, the predicted stack pressure based on a stack pressure setpoint and maximum permissible pressure based on a compressor speed.

3. The system of claim 1, wherein the capacitance model is configured to generate input for both the valve position model and at least one of the plurality of pressure drop models.

4. A controller for a fuel cell system comprising:
at least one processor; and
a memory in signal communication with the at least one processor to store instructions, wherein the at least one processor is programmed to execute the instructions in memory to control reactant pressure in a fuel cell stack by regulating the position of a backpressure valve connected to an outlet of the fuel cell stack through the use of a valve position model, a stack capacitance model and at least one pressure drop model that cooperate in response to an operational transient in the fuel cell stack, wherein output from the stack capacitance model modifies at least one parameter used as a stack flow control signal by at least one of the valve position model and at least one pressure drop model and the output from the stack capacitance model is based on the Ideal Gas Law according to:

$$dm_{cap} = \frac{(p_{stck,fd} - p_{prdtd}) * V}{R * T_{stck}} \cdot M_{air}$$

where dm$_{cap}$ is a modifying airflow setpoint signal corresponding to the modifying output, R is gas constant, T$_{cool,out}$ is the stack coolant outlet temperature, V is the volume of the fuel cell stack and M$_{air}$ is the airflow molecular weight.

5. The controller of claim 4, wherein the at least one processor is further configured to control a compressor that is in fluid communication with an inlet of the fuel cell stack.

6. The controller of claim 4, wherein the input into the stack capacitance model comprises values corresponding to a pressure change in the fuel cell stack, a coolant temperature in the fuel cell stack, a fuel cell stack volume and a predicted pressure in the fuel cell stack, the predicted pressure based on a compressor speed and maximum permissible pressure.

7. The controller of claim 6, wherein output from the stack capacitance model is used as input for both the valve position model and the at least one pressure drop model.

8. The controller of claim 4, wherein the at least one pressure drop model comprises a plurality of pressure drop models such that a first pressure drop model is configured to cooperate with the at least one processor to predict pressure at the inlet of the backpressure valve, while a second pressure drop model is configured to cooperate with the at least one processor to predict pressure at the outlet of the backpressure valve.

9. The controller of claim 4, wherein the instructions further cause the at least one processor to determine if the operational transient in the fuel cell stack has caused a stack pressure setpoint to change, and to generate a stack flow setpoint value offset by the stack flow offset value in the event the stack pressure setpoint has changed.

* * * * *